United States Patent [19]
Fishman

[11] Patent Number: 5,654,816
[45] Date of Patent: Aug. 5, 1997

[54] PERFORMANCE MONITORING AND FAULT LOCATION IN OPTICAL TRANSMISSION

[75] Inventor: Daniel A. Fishman, Lakewood, N.J.

[73] Assignee: Lucent Technologies Inc., Murray Hill, N.J.

[21] Appl. No.: 659,451

[22] Filed: Jun. 6, 1996

Related U.S. Application Data

[63] Continuation of Ser. No. 296,305, Aug. 25, 1994, abandoned.

[51] Int. Cl.$^6$ .......................... H04B 10/02; H04B 10/08
[52] U.S. Cl. .................. 359/177; 359/110; 359/124; 359/134; 359/161; 370/500; 455/67.1
[58] Field of Search .................. 359/110, 124, 359/134, 160–161, 177, 179, 341; 330/2, 59, 308; 455/67.1; 370/491, 500; 324/76.57, 118, 123 R, 647, 665

[56] References Cited

U.S. PATENT DOCUMENTS 5,313,657  5/1994  Sakamoto et al. ..................... 330/2

OTHER PUBLICATIONS

"A Transport Network Layer Based on Optical Network Elements", Journal of Lightwave Technology, vol. 11, No. 5/6, G. R. Hill et al., May/Jun. 1993, pp. 667–679.

Primary Examiner—Kinfe-Michael Negash

[57] ABSTRACT

Monitoring of optical amplifiers is accomplished, in accordance with the invention, by an apparatus and method for detecting a power level of a tone modulated upon a signal input to the amplifier, detecting an output power level of the amplifier, and comparing the power level of the tone to the output power level of the amplifier to determine an indication of the performance of the amplifier. In illustrative embodiments of the invention, each of the individual channels within a multiplexed optical signal are modulated with a specific low-frequency tone. The modulating is performed at the transmission site of the optical signal, and the specific tone frequencies are chosen to be lower than the low-frequency cut-off of any other information encoded upon the optical signal. The channel power of each channel is determined after each stage of optical amplification in the network by measuring the power of its respective unique low-frequency tone using a low-cost monitor. The total optical output power of the optical amplifier is also measured by the monitor. The ratio between the tone power and the optical amplifier output power after the first stage of optical amplification in the network is compared to the tone power/output power ratio at each subsequent optical amplification stage. Changes between the first and subsequent tone power/output power ratios reflect changes in network performance. The changes in tone power/output power ratio are strongly correlated to actual changes in optical signal-to-noise ratio. Advantageously, such a monitor may be built-in to each optical amplifier in the network, and no complex calibration of any components in the network is needed. Since each optical amplifier has a dedicated monitor which determines the status of each channel, faults in the network may be readily and quickly located to a specific optical amplifier and a specific channel.

35 Claims, 8 Drawing Sheets

PERFORMANCE MONITORING AND FAULT LOCATION IN OPTICAL TRANSMISSION

This application is a continuation of application Ser. No. 08/296,305, filed on Aug. 25, 1994 now abandoned.

TECHNICAL FIELD

This invention relates to the optical transmission of information. More particularly, this invention relates to monitoring the performance of optical amplifier chains used in optical transmission systems and locating faults in optical transmission systems.

BACKGROUND OF THE INVENTION

Multi-channel optical transmission equipment deployed in communications networks must be monitored in a manner which allows system performance and the location of faults to be ascertained quickly and reliably. Typically, this is accomplished in regenerative-type optical transmission systems by electrically monitoring each channel at each regeneration site. However, regenerative-type optical transmission systems are expected to be replaced by systems which utilize chains of optical amplifiers arranged in stages to periodically boost an optical signal as it travels over the network. Electrical monitoring is impractical in these systems because the optical signal is not generally converted to an electrical signal until it reaches the receiver.

Ideally, a monitoring technique for transmission systems using chains of optical amplifiers should allow a determination of the performance of each of the individual channels amplified by each optical amplifier in the chain, at each stage of amplification. The ability to determine and indication of the optical signal-to-noise ratio ("CO-SNR")—a key performance parameter—would be a particularly desirable monitoring feature. It would also be desirable to be able to isolate faults to a specific channel of a particular optical amplifier in the chain.

Some monitoring and fault location techniques require that channel performance be measured at each amplification stage using complex and expensive measuring equipment. Other techniques may require the performance of complex calibrations of various electrical and optical components in the network.

SUMMARY OF THE INVENTION

Monitoring of optical amplifiers is accomplished, in accordance with the invention, by an apparatus and method for detecting a power level of a tone modulated upon a signal input to the amplifier, detecting an output power level of the amplifier, and comparing the power level of the tone to the output power level of the amplifier to determine an indication of the performance of the amplifier.

In illustrative embodiments of the invention, each of the individual channels within a multiplexed optical signal are modulated with a specific low-frequency tone. The modulating is performed at the transmission site of the optical signal, and the specific tone frequencies are chosen to be lower than the low-frequency cut-off of any other information encoded upon the optical signal. The channel power of each channel is determined after each stage of optical amplification in the network by measuring the power of its respective unique low-frequency tone using a low-cost monitor. The total optical output power of the optical amplifier is also measured by the monitor. The ratio between the tone power and the optical amplifier output power after the first stage of optical amplification in the network is compared to the tone power/output power ratio at each subsequent optical amplification stage. Changes between the first and subsequent tone power/output power ratios reflect changes in network performance. The changes in tone power/output power ratio are strongly correlated to actual changes in optical signal-to-noise ratio. Advantageously, such a monitor may be built-in to each optical amplifier in the network, and no complex calibration of any components in the network is needed. Since each optical amplifier has a dedicated monitor which determines the status of each channel, faults in the network may be readily and quickly located to a particular optical amplifier and a particular channel.

The discussion in this Summary and the following Brief Description of the Drawings, Detailed Description, and drawings only deals with examples of this invention and is not to be considered in any way a limitation on the scope of the exclusionary rights conferred by a patent which may issue from this application. The scope of such exclusionary rights is set forth in the claims at the end of this application.

DETAILED DESCRIPTION

In an illustrative example of the invention, a wavelength multiplexed optical signal, comprising four individual optical component signals having wavelengths of $\lambda_1$, $\lambda_2$, $\lambda_3$ and $\lambda_4$, is transmitted from a source to a receiver via a transmission line. Each of these individual component optical signals is modulated with a specific low-frequency tone—$f_1$, $f_2$, $f_3$, and $f_4$, respectively. This modulation may be accomplished, for example, by amplitude or frequency modulating each of the four individual component optical signals. Other suitable techniques include amplitude and frequency shift keying, polarization modulation, and combinations of these techniques. The low-frequency modulation is independent of, and in addition to, any other modulation of the individual component optical signals, such as digital or analog information encoding. For purposes of the discussion that follows, amplitude modulation is assumed. Any number of conventional techniques for amplitude modulating an optical signal may be employed to effect the low-frequency modulation of the individual component optical signals. One such technique, for example, employs sine waveforms of frequencies $f_1$, $f_2$, $f_3$, and $f_4$ to dither the bias current of each of the lasers that are typically used to produce the individual component optical signals. While various low-frequency modulation techniques may be used, it is preferable that the modulation frequencies $f_1$, $f_2$, $f_3$, and $f_4$ be lower than the low-frequency cut-off of any receiver coupled to the transmission line for purposes of decoding digital or analog information. This ensures that the reception of any information carried by the individual component optical signals not be interfered with as a result of the modulating with a low-frequency tone. It should be noted that the choice of four component optical signals in this illustrative example is arbitrary and that the principles of the invention can be readily applied to optical signals having other than four components.

Figure 1:
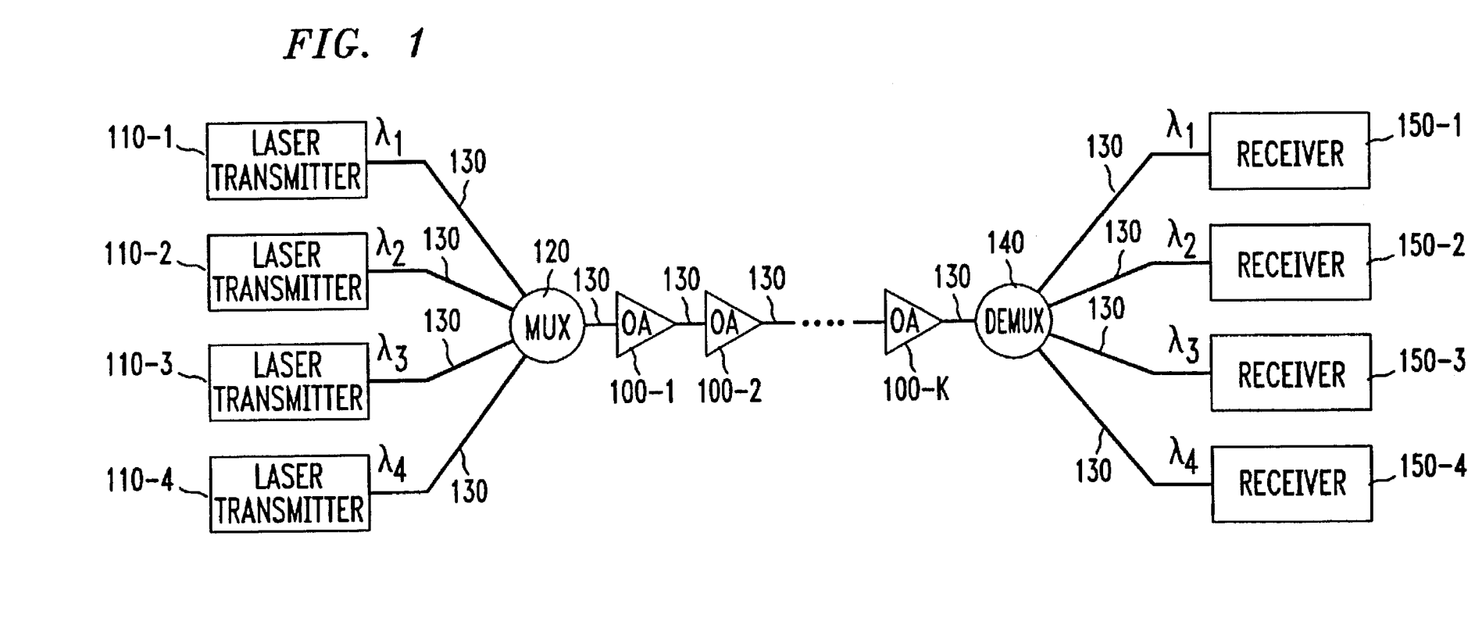
FIG. 1 is a simplified block diagram of an optical transmission system incorporating an illustrative example of the invention.

FIG. 1 is a simplified block diagram of an optical transmission system incorporating an illustrative example of the invention. As shown, four laser transmitters, 110-1, 110-2, 110-3, 110-4, a multiplexer 120, a plurality of optical amplifiers 100, a transmission line 130, a demultiplexer 140, and four receivers 150-1, 150-2, 150-3, and 150-4 are included in the system. Each laser transmitter outputs an individual component optical signal having unique wavelength. In this example, the wavelengths of the individual component optical signals are $\lambda_1$, $\lambda_2$, $\lambda_3$ and $\lambda_4$. While lasers are preferably used to implement the invention, other optical sources may also be used to generate the optical signal, for example, light emitting diodes and other non-coherent sources.

Each individual component optical signal may be modulated to carry information by a modulator (not shown) which, in this example, is integrated with the laser transmitters. Each individual component optical signal is also modulated with a low-frequency tone as described above. The optical signals output from laser transmitters 110 are multiplexed in multiplexer 120 which outputs a single optical signal having four channels. The four channels are defined by the four unique wavelengths, $\lambda_1$, $\lambda_2$, $\lambda_3$ and $\lambda_4$, of the individual component optical signals generated by laser transmitters 110. The four-channel optical signal from multiplexer 120 is injected into transmission line 130 where it travels to demultiplexer 140 and receivers 150 after amplification by optical amplifiers 100.

As noted above, the four-channel optical signal is periodically boosted by optical amplifiers as it travels along transmission line 130. In the illustrative optical transmission system of FIG. 1, a plurality of optical amplifiers 100-1, 100-2, 100-3, . . . 100-k are shown. Of course, the number of optical amplifiers used in a particular optical transmission systems will depend upon various factors that will be apparent to those skilled in the art, and may vary from the number of illustrative optical amplifiers shown here. As described below, the invention may be applied to optical communication systems employing k optical amplifiers where k is preferably at least two.

Figure 2:
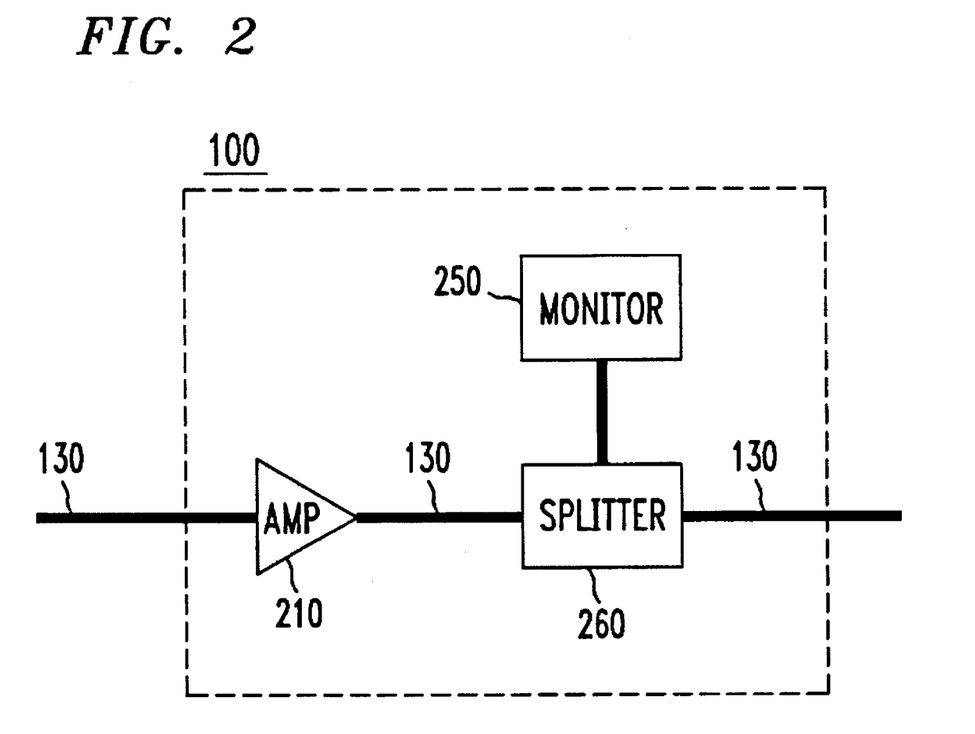
FIG. 2 is a simplified block diagram of an optical amplifier, in accordance with the invention, used in the optical transmission system shown in FIG. 1.

FIG. 2 is a simplified block diagram of an optical amplifier, in accordance with the invention, used in the optical transmission system shown in FIG. 1. Optical amplifier 100 comprises an amplifier 210 having an input and an output to transmission line 130 (FIG. 1). Amplifier 210 could be, for example, a rare earth-doped optical fiber amplifier such as an erbium-doped fiber amplifier. Optical amplifier 100 also comprises monitor 250 which taps a small fraction of the output of amplifier 210 using, for example, optical splitter 260 which is spliced into transmission line 130 near the output of amplifier 210. It would be desirable, in many applications, to tap approximately 5% or less of the output of amplifier 210 to minimize any losses associated with monitoring.

Figure 3:
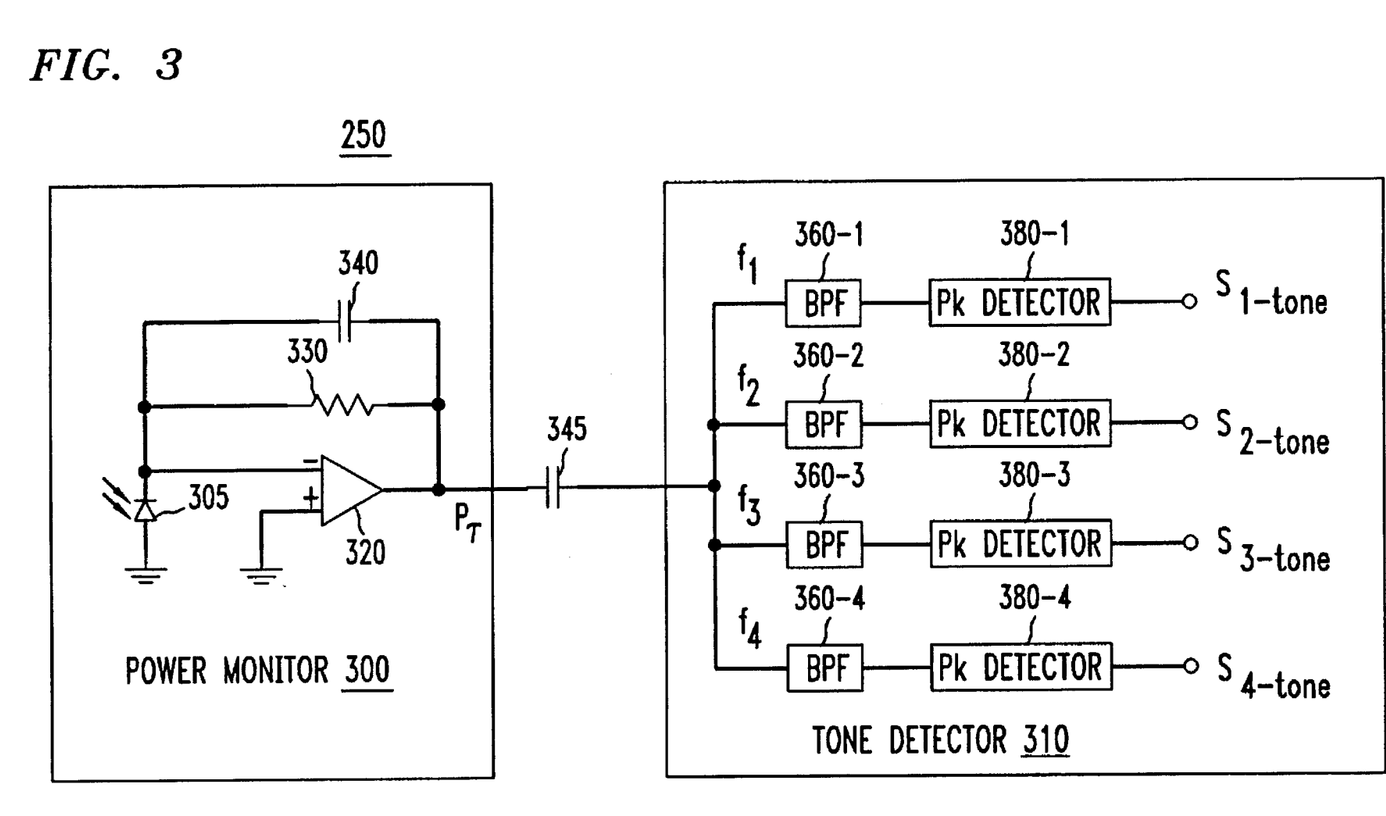
FIG. 3 is a simplified block diagram of a monitor circuit, in accordance with the invention.

FIG. 3 is a simplified schematic diagram of the circuit used in the monitor 250 shown in FIG. 2. The circuit is divided into two portions—a power monitor and tone detector. In power monitor 300, photodiode 305 converts the tapped optical output from amplifier 210 (FIG. 2) into an electrical signal which is amplified by operational amplifier 320. Photodiode 305 may comprise a low-cost germanium diode with a maximum bandwidth of approximately 1 MHz. The values of resistor 330 and capacitor 340 are chosen so that the reciprocal of the RC time constant is greater than 20 kHz. The electrical signal at the output of operational amplifier 320 is proportional to the total optical power of amplifier 210, $P_T$. $P_T$, in this illustrative example, includes both signal power and noise power components.

Power monitor 300 is coupled via capacitor 345 to tone detector 310. A bank of bandpass filters is utilized to filter the signal from power monitor 300 into its constituent low-frequency tones. Thus, bandpass filters 360-1, 360-2, 360-3, and 360-4 are tuned to the tone frequencies $f_1$, $f_2$, $f_3$, and $f_4$, respectively. Preferably, each bandpass filter has a nominal bandwidth of 75 Hz ($Q \approx 100$) and a center frequency gain of approximately 13 dB. Peak detectors 380-1, 380-2, 380-3, and 380-4 are positioned as shown after the bandpass filter bank. The electrical signals at the outputs of peak detectors 380 are proportional to the tone power, $S_{j\text{-}tone}$ of the j optical channels, respectively. In this example, as discussed above, there are four optical channels. Thus j=1, 2, 3, and 4.

The ratio between the tone power for the kth optical amplifier in the optical communication system having j channels, $S_{jk\text{-}tone}$ and the total optical output power of the kth optical amplifier, $P_{Tk}$, is given by $$C_{jk} = 20\log_{10}\frac{S_{jk\text{-}tone}}{P_{Tk}} \qquad (1)$$

For purposes of clarity in the discussion that follows, the ratio between tone power and total optical power for the jth channel of the kth optical amplifier will be referred to as $C_{jk}$.

The optical signal-to-noise ratio ("O-SNR") is generally very high after the first stage (k=1) of optical amplification in an optical transmission system. Typically, O-SNR will be greater than 30 dB at this point in the system. Thus, $C_{j1}$ is a good representation of a nearly noise-free signal. In accordance with the principles of the invention, performance monitoring of an optical transmission system with k optical amplifiers may be achieved by comparing $C_{jk}$ with $C_{j1}$ for each channel after each kth stage of optical amplification. A change in the performance of the kth optical amplifier in the optical transmission system will be reflected by a change in $C_{jk}$ when compared with $C_{j1}$. A ±0.25 dB variation in $C_{jk}$ values may be expected due to tolerances of the components used in the monitor circuit shown in FIG. 3. Therefore, a difference greater than ±0.25 dB between $C_{jk}$ and $C_{j1}$ must be as a result of a change in either the signal or noise at the output of the kth optical amplifier. Advantageously, using $C_{jk}$ allows performance monitoring of the optical amplifiers without the need for any calibrations of any components in the system.

Figure 4:
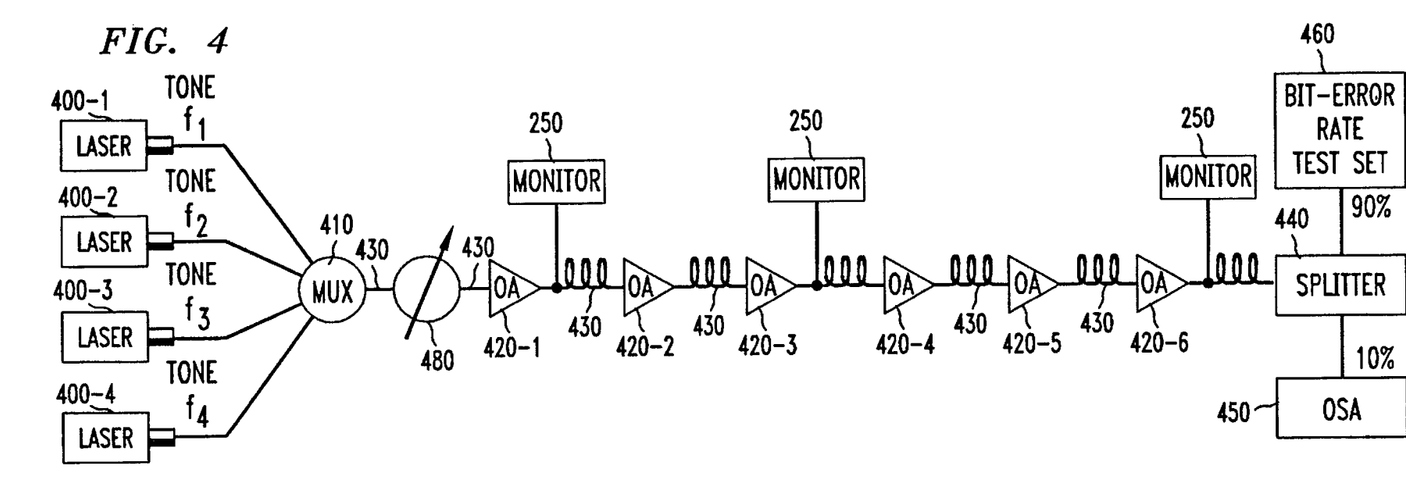
FIG. 4 is a simplified block diagram of equipment used to generate experimental results that are used to illustrate various principles of the invention.

FIGS. 5–10 provide graphical illustrations of experimental results showing the changes in $C_{jk}$ that occur as the input signal power to an optical amplifier in an optical transmission system is reduced. FIG. 4 is a simplified block diagram of experimental apparatus used to generate the results shown in FIGS. 5–10. As shown in FIG. 4, on the transmitting end, four laser transmitters 400-1, 400-2, 400-3, and 400-4 generate optical signals having wavelengths of 1550.7, 1554, 1556.8, and 1559.1 nm, respectively, which are modulated by modulators (not shown) to carry data in response to signals from external data sources (not shown). Each laser transmitter 400 is modulated with a specific low-frequency tone as described above. The optical signals from the laser transmitters are combined into a single wavelength-multiplexed optical signal in multiplexer 410. The wavelength-multiplexed optical signal travels through variable optical attenuator 480 to optical amplifier 420-1. Optical amplifier 420-1 is arranged in a concatenated fashion, as shown, with five other optical amplifiers and a transmission line 430. Transmission line 430 has a total length of 516.5 km in this example. Optical amplifiers 420-1, 420-3, and 420-6 are equipped with monitor 250 shown in FIG. 2. On the receiving end, optical splitter 440 allows 10% of the output from optical amplifier 420-1 to be directed to optical spectrum analyzer 450 and 90% to bit-error rate test set 460.

Figure 5:
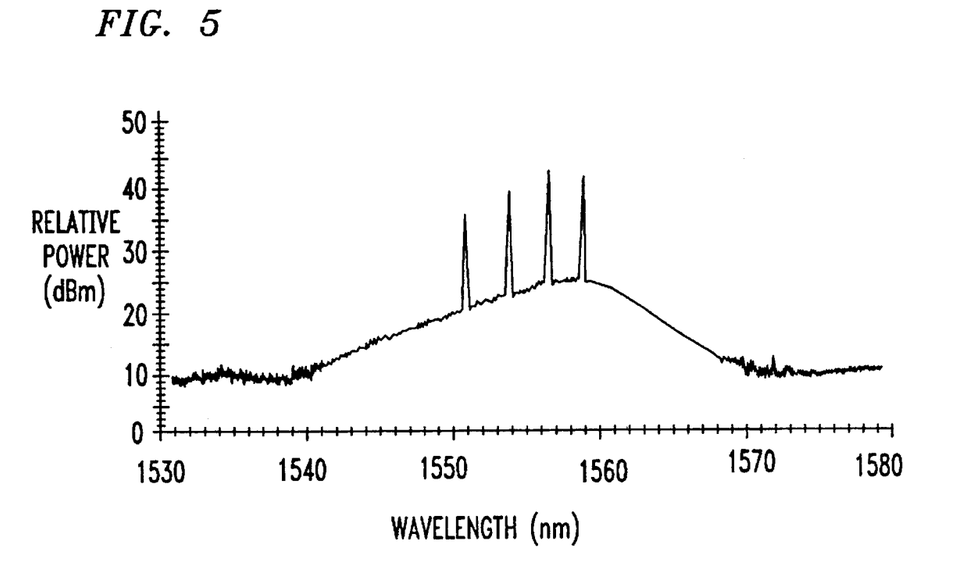
FIGS. 5–10 provide a graphical illustration of experimental results showing the changes in the ratio of tone to total signal power that occur as the input signal power to the first optical amplifier shown in FIG. 1 is reduced.
Figure 6:
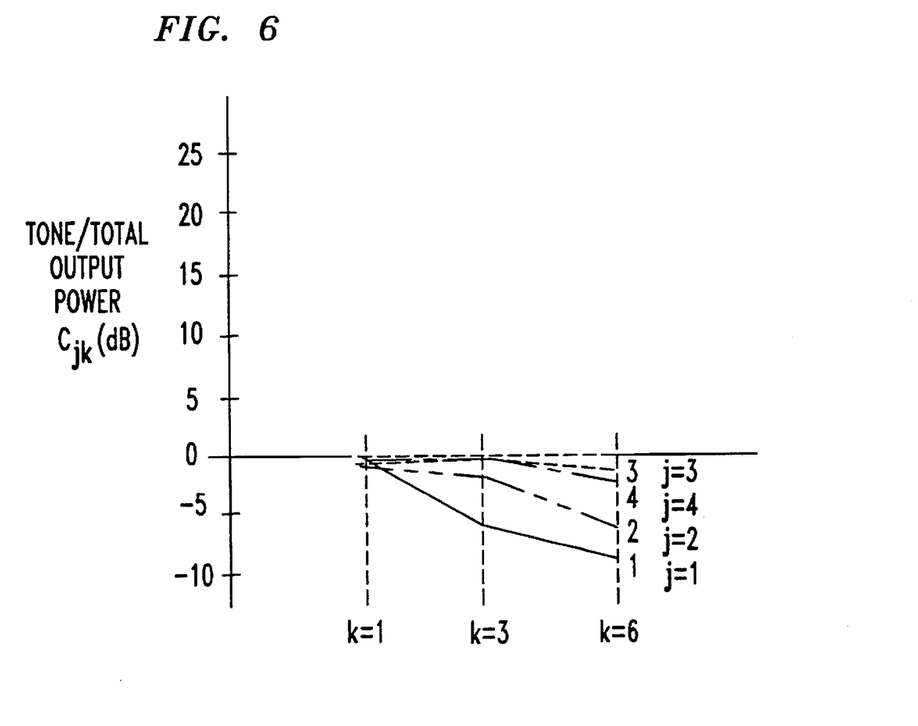

FIG. 5 shows the optical power gain profile of the wavelength-multiplexed optical signal after amplification by the six optical amplifiers shown in FIG. 4 as measured by optical spectrum analyzer 450. The input power to optical amplifier 420-1 in this example is approximately −15.8 dBm. As shown, the gain profile after six stages of optical amplification is not uniformly distributed across the optical spectrum due to accumulation of amplified stimulated emission ("ASE") noise in the chain of optical amplifiers. Therefore, the channels having lower wavelengths will experience less signal amplification, and have lower signal-to-noise ratios, as compared to channels having higher wavelengths. FIG. 6 shows a graphical representation of the $C_{jk}$ values for k=1, 3, 6 and j=1, 2, 3, 4 at the −15.8 dBm input power which are determined in accordance with the invention as described above. As shown in FIG. 6, after the first stage of optical amplification (i.e., for k=1), the channel powers as reflected by $C_{jk}$ are uniform. For k=3 and k=6, it is evident that channels 1 and 2 have been degraded. This observation is consistent with the gain profile shown in FIG. 5 since the channels near the optical amplifier gain peak have an improved signal-to-noise ratio compared with those channels having lower wavelengths. Channels 3 and 4 show no substantial degradation as reflected by higher values for $C_{3,3}$, $C_{3,6}$, $C_{4,3}$, and $C_{4,6}$. The O-SNR for channels 3 and 4 is approximately 23.5 dB as measured by optical spectrum analyzer 450 (FIG. 4).

Figure 7:
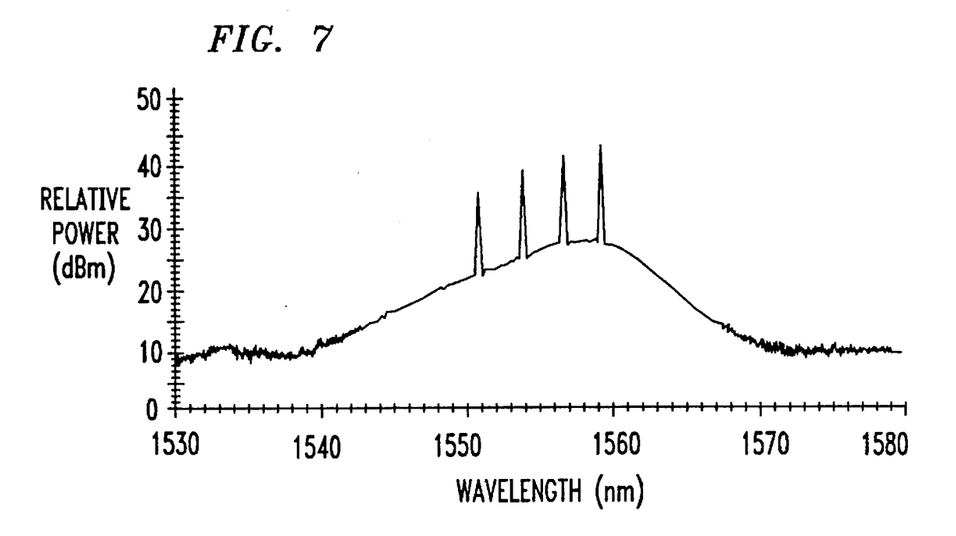
Figure 8:
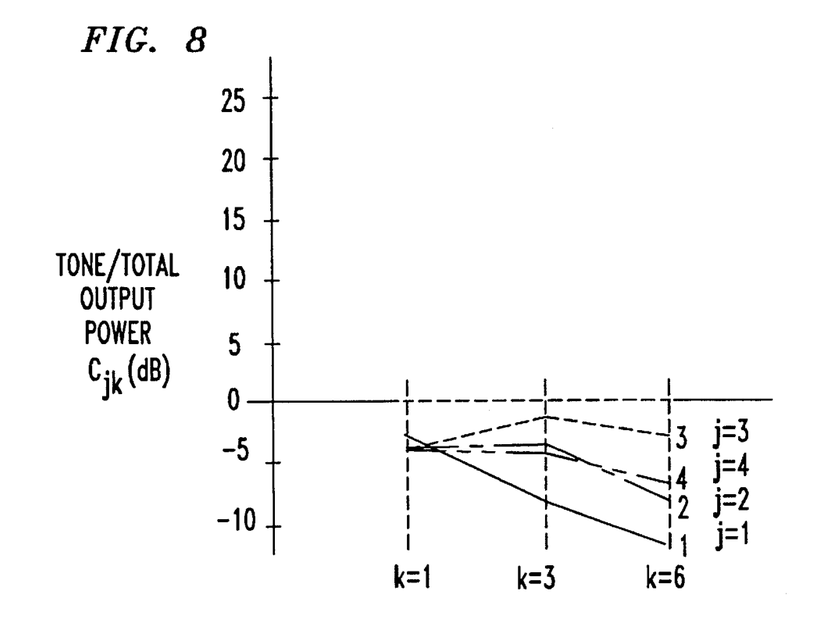

FIG. 7 shows the measured gain profile of the optical transmission system shown in FIG. 4 after the six stages of optical amplification with a reduced input power of approximately −22.8 dBm to optical amplifier 420-1. This reduction in input power is effectuated by adjusting variable optical attenuator 480 (FIG. 4). FIG. 8 shows a decline in $C_{jl}$ values of approximately 3–5 dB for all j channels in this example corresponding the degradation in O-SNR due to the reduced input power. The measured O-SNR for channel 4 is approximately 19 dB resulting in a bit-error rate of approximately 4.8×10$^{10}$ as measured by bit-error rate test set 460.

Figure 9:
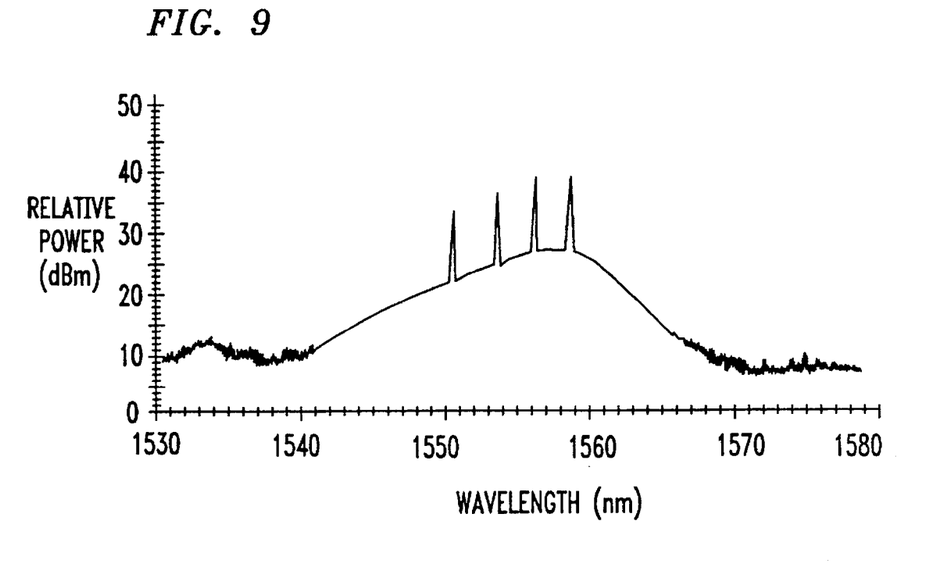
Figure 10:
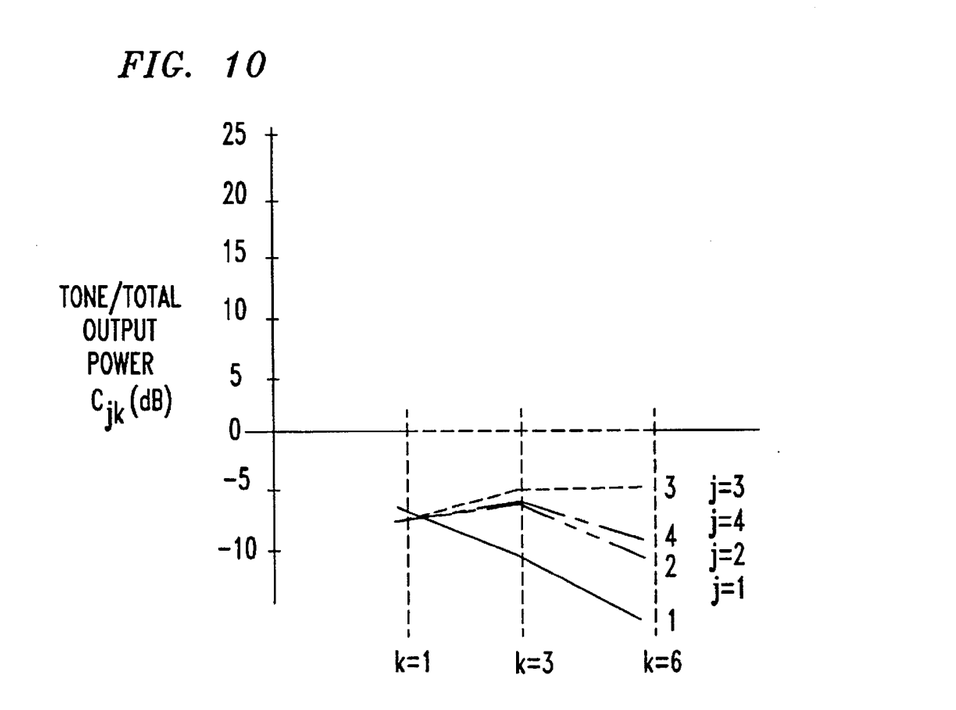

FIG. 9 shows the measured gain profile of the optical transmission system shown in FIG. 4 after the six stages of optical amplification with a reduced input power of approximately −26.3 dBm to optical amplifier 420-1. FIG. 10 shows a substantial decline in $C_{jl}$ values of approximately 7–9 dB for all j channels in this example corresponding the degradation in O-SNR due to the reduced input power. The measured O-SNR for channel 4 is approximately 15.9 dB resulting in a measured bit-error rate of approximately 9×10$^{-7}$.

The experimental results described above demonstrate that $C_{jk}$ values may be quite readily utilized to monitor signal degradations that are introduced anywhere in optical amplifier chain. Additionally, the locations of faults may be quickly and readily identified because the status of each of the j channels is known at each of the k optical amplifiers in the optical transmission system. It will be appreciated by those skilled in the art that $C_{jk}$ values may be conveniently transmitted via telemetric or other networks means to a remote maintenance location in order to implement an low-cost and effective fault location system.

The actual O-SNR of an optical signal is, advantageously, strongly correlated to $C_{jk}$ values determined in accordance with the invention as described above. As will be appreciated by those skilled in the art, O-SNR is a key performance parameter, and thus, the ability to determine O-SNR without complex calibration or measurement equipment is a particularly desirable feature of the present invention.

Figure 11:
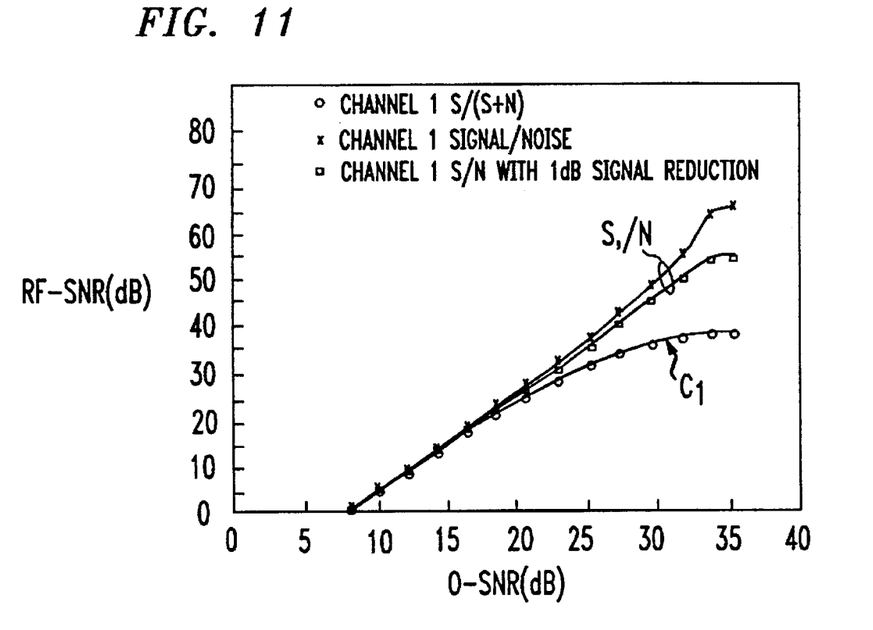
FIG. 11 shows a graph of RF-SNR as a function of O-SNR for a single optical channel.

FIG. 11 shows as graph of $C_{11}$ values as a function of O-SNR for one optical channel after one stage of optical amplification, where O-SNR is measured by an optical spectrum analyzer with 0.1 nm bandwidth. As shown, the $C_{11}$ values indicate that above 25 dB of O-SNR, $C_{11}$ saturates. The slope of $C_{11}$ curve is approximately 2 for values below 25 dB, and approaches zero above 25 dB. Identical results are obtained for more than two optical channels with varying amounts of modulation. The saturation apparent in FIG. 11 is due to the fact that $C_{11}$ is proportional to the ratio of signal to signal+noise, which approaches 1 for high signal-to-noise ratios. The slope results from the observation that the electrical signal is measured with a square-law device where power is proportional to photocurrent squared.

A parameter even more strongly correlated to O-SNR, herein defined as "RF-SNR," may be determined since the relationship between measured tone power and optical channel signal is known. Thus, RF-SNR—the signal-to-noise ratio of the jth channel at the kth optical amplifier—may be found according to:

$$(RF-SNR)_{jk} = \frac{S_{jk}}{\text{noise}} = \frac{<S_{jk}>}{P_{T_k} - \sum_{i=1}^{4} <S_{jk}>} \quad (2)$$

where the average signal $<S_{jk}>$ may be expressed in terms of the tone power $S_{jk-tone}$ as measured by monitor 250 (FIG. 2), $$<S_{jk}> = \sqrt{2} \; \frac{S_{jk-tone}}{m_j G_j D_j} \quad (3)$$

In Equation 2, the noise is obtained by subtracting the total signal $$\sum_{i=1}^{4} <S_{jk}>$$

from total optical power $P_{T_k}$. In Equation (3), $m_j$ is the index of modulation of laser transmitters 110 (FIG. 1), $G_j$ is the filter gain of bandpass filters in monitor 250 (FIG. 2) and $D_j$ is the gain of peak detectors 380 (FIG. 3).

Figure 12:
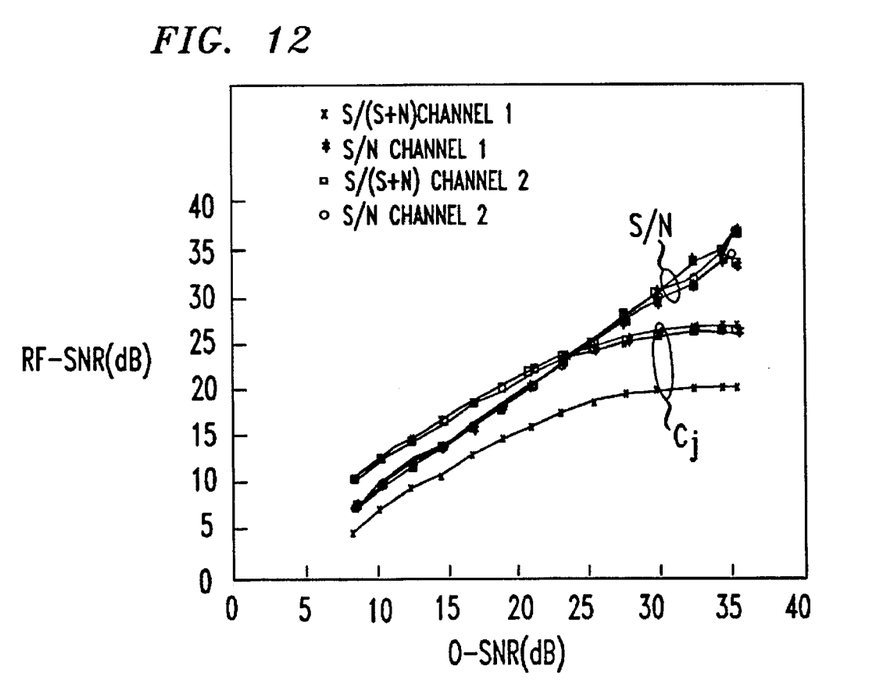
FIG. 12 shows a graph of corrected RF-SNR as a function of O-SNR for two modulated optical channels and two different modulation indices.

To relate (RF-SNR)$_{11}$ to O-SNR it is necessary to divide RF-SNR values by two. In addition, as shown in FIG. 11, the (RF-SNR)$_{11}$/O-SNR slope exceeds 2 when the O-SNR exceeds 30 dB. This effect arises because the nominator in Equation (2) approaches zero for high values of O-SNR. The effect can be significantly lessened by reducing $<S_{jk}>$ by approximately 1 dB in Equation (2) to achieve a "corrected" RF-SNR. FIG. 12 shows a graph of RF-SNR as corrected by 27 dB to account for the 50 nm noise bandwidth of the RF-SNR measurement relative to the 0.1 nm bandwidth of the O-SNR measurement (as measured by an optical spectrum analyzer), as a function of O-SNR for two modulated optical channels and two different modulation indices. As shown, the corrected RF-SNR is strongly correlated to the measured O-SNR even for O-SNR values exceeding 33 dB.

It will be understood that the particular techniques described above are only illustrative of the principles of the present invention, and that various modifications could be made by those skilled in the art without departing from the scope and spirit of the present invention, which is limited only by the claims that follow.

I claim:

1. A method for monitoring the performance of an optical amplifier, the amplifier having an input port and an output port, the method comprising the steps of:

detecting, at the output of the amplifier, a level of a tone modulated upon a signal input to the amplifier;

detecting an output level of the amplifier; and determining a signal-to-noise ratio for said optical amplifier as a function of the level of said tone and the output level of the optical amplifier.

2. The method of claim 1 in which the signal comprises a plurality of multiplexed channels.

3. The method of claim 2 in which a specific tone is modulated upon each of the plurality of multiplexed channels.

4. The method of claim 3 in which the tone detector detects a power level of each of the specific tones.

5. The method of claim 4 in which the comparing means compares the power level of each of the specific tones to the power level of the amplifier.

6. The method of claim 5 in which the performance includes the performance of the amplifier in amplifying each of the channels of the signal.

7. The method of claim 4 in which the indication of performance is a representation of optical signal-to-noise ratio.

8. The method of claim 2 in which the modulating is performed by frequency modulating selected ones of the multiplexed channels.

9. The method of claim 2 in which the modulating is performed by amplitude modulating selected ones of the multiplexed channels.

10. The method of claim 2 in which the modulating is performed by polarization modulating selected ones of the multiplexed channels.

11. The method of claim 1 in which the indication of performance is an indication of optical signal to noise ratio.

12. The method of claim 1 in which the performance monitoring steps are applied to at least one of a plurality of optical amplifiers.

13. The method of claim 12 in which the performance monitoring steps are applied to no more than one of the plurality of optical amplifiers.

14. The method of claim 12 further including the step of comparing a tone power level to an output power level ratio at a first optical amplifier in the plurality of optical amplifiers to a tone power level to output power level ratio at at least one other optical amplifier in the plurality of optical amplifiers to determine an indication of the performance of at least one of the plurality of optical amplifiers.

15. The method of claim 14 in which the plurality of optical amplifiers are arranged in stages.

16. The method of claim 15 in which the first optical amplifier in the plurality of optical amplifiers is coupled to at least one optical source.

17. The method of claim 1 in which the signal is modulated to carry information, the information modulation being independent of, and in addition to, the modulation with the tone.

18. The method of claim 1 in which selected ones of the specific tones are modulated at a frequency lower than a low-frequency cut-off of a receiver coupled to receive the signal.

19. A method for monitoring the performance of an amplifier having an input port and an output port and amplifying a wavelength division multiplexed signal having a plurality of optical channels, the method comprising the steps of:

detecting, at the output port of the amplifier, levels of individual ones of tones of different frequencies modulated upon respective ones of the plurality of channels of the wavelength division multiplexed signal;

summing each of said levels to determine a total signal level at the output of said amplifier;

detecting an output level of the amplifier and determining a noise level for said amplifier as a function of said sum and the output level of the amplifier; and determining a signal-to-noise ratio of each said optical channels as a function of said levels and said noise level.

20. A method for monitoring the performance of a transmission system including a plurality of amplifiers comprising the step of:

employing the method of performance monitoring as defined in claim 31 for predetermined ones of the plurality of amplifiers.

21. The method of claim 20 in which the tone is modulated at a frequency lower than a low-frequency cut-off of a receiver coupled to receive the wavelength division multiplexed signal.

22. The method of claim 20 in which the modulating is performed by frequency modulating each of the channels of the wavelength division multiplexed signal.

23. The method of claim 20 in which the modulating is performed by amplitude modulating each of the channels of the wavelength division multiplexed signal.

24. The method of claim 20 in which the modulating is performed by polarization modulating each of the channels of the wavelength division multiplexed signal.

25. The method of claim 20 in which the wavelength division multiplexed signal is modulated to carry information, the modulation being independent of, and in addition to, the modulating with the tones.

26. The method of claim 19 in which the step of comparing includes comparing a power level of selected specific tones to a power level of the amplifier.

27. A method for monitoring performance of an optical transmission system including a plurality of amplifiers arranged in stages, each of the plurality of amplifiers having an input port and an output port, the method comprising the steps of:

modulating a signal transmitted on the transmission system with a tone;

monitoring a level of the tone at predetermined amplifiers in the stages of amplification, whereas said monitoring is performed at the output port of the predetermined amplifiers;

monitoring an output level of selected ones of the predetermined amplifiers; and determining a signal-to-noise ratio for each of the selected ones of the predetermined optical amplifiers as a function of the respective level of tone and respective output level.

28. The method as claimed in claim 27 in which the signal is an wavelength division multiplexed optical signal having a plurality of channels, each of the channels being modulated with a specific tone.

29. The method of claim 28 in which selected ones of the specific tones are modulated at a frequency lower than a low-frequency cut-off of a receiver coupled to receive the wavelength-division multiplexed optical signal.

30. The method of claim 28 in which the modulating is performed by frequency modulating selected ones of the channels of the wavelength division multiplexed optical signal.

31. The method of claim 28 in which the modulating is performed by amplitude modulating selected ones of the channels of the wavelength division multiplexed optical signal.

32. The method of claim 28 in which the modulating is performed by polarization modulating selected ones of the channels of the wavelength division multiplexed optical signal.

33. The method of claim 28 in which the wavelength division multiplexed signal is modulated to carry information, the information modulation being independent of, and in addition to, the modulation with the tones.

34. The method as claimed in claim 27 in which the amplifier is an optical amplifier.

35. The method as claimed in claim 34 in which the optical amplifier is an erbium-doped fiber amplifier.

* * * * *